(12) United States Patent
Tanaka

(10) Patent No.: US 8,260,898 B2
(45) Date of Patent: Sep. 4, 2012

(54) MOBILE TERMINAL MAIL SYSTEM, MOBILE TERMINAL MAIL CONTROL METHOD, AND MOBILE TERMINAL MAIL CONTROL PROGRAM

(75) Inventor: Yuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 718 days.

(21) Appl. No.: 12/170,289

(22) Filed: Jul. 9, 2008

(65) Prior Publication Data

US 2009/0025069 A1    Jan. 22, 2009

(30) Foreign Application Priority Data

Jul. 19, 2007   (JP) ................. 2007-188405

(51) Int. Cl.
*G06F 15/173* (2006.01)
(52) U.S. Cl. .............. 709/223; 709/236; 709/203
(58) Field of Classification Search ............ 709/233, 709/223, 236, 203
See application file for complete search history.

(56) References Cited

U.S. PATENT DOCUMENTS

| | | | |
|---|---|---|---|
| 2003/0046335 A1* | 3/2003 | Doyle et al. | 709/203 |
| 2007/0106740 A1* | 5/2007 | Yach et al. | 709/206 |
| 2007/0149192 A1 | 6/2007 | Kim et al. | |
| 2007/0216760 A1* | 9/2007 | Kondo et al. | 348/14.02 |
| 2008/0313290 A1* | 12/2008 | Park | 709/206 |

FOREIGN PATENT DOCUMENTS

| | | | |
|---|---|---|---|
| EP | 1770943 | * | 4/2007 |
| EP | 1770943 A1 | | 4/2007 |
| EP | 1906607 A1 | | 4/2008 |
| JP | 2003032751 A | | 1/2003 |
| JP | 2003209870 A | | 7/2003 |
| JP | 2006173778 A | | 6/2006 |
| JP | 2006262327 A | | 9/2006 |

OTHER PUBLICATIONS

European Seach Report for EP Application No. 08159239 completed Sep. 23, 2008.

* cited by examiner

*Primary Examiner* — Christopher Brown
(74) *Attorney, Agent, or Firm* — Michael Dryja

(57) ABSTRACT

The mobile terminal mail system includes a plurality of wireless communication networks having different communication speeds, a multi-access terminal including electronic mailer, and an electronic mailer activation server which is adapted to, when the multi-access terminal has connected to one of the wireless communication networks whose communication speed is equal to or greater than a fixed communication speed, activate an electronic mailer through the wireless communication network.

13 Claims, 4 Drawing Sheets

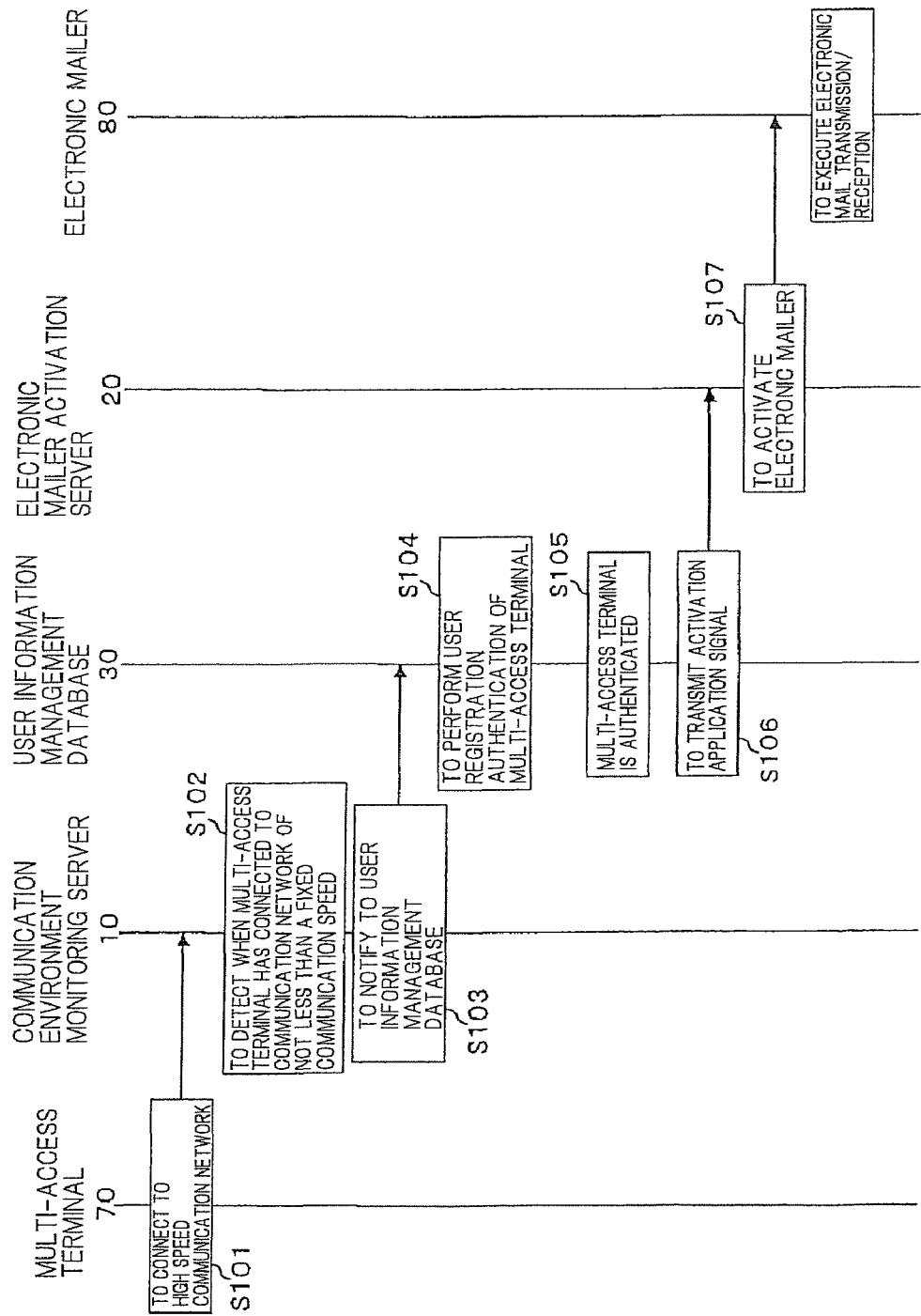

FIG. 3

| COMMUNICATION CONDITIONS | CORRESPONDING POLICY |
|---|---|
| WITHIN COVERAGE OF HIGH SPEED COMMUNICATION NETWORK 40 | TO TRANSMIT/RECEIVE ALL MAILS |
| WITHIN COVERAGE OF MIDDLE SPEED COMMUNICATION NETWORK 50 | TO ALLOW TRANSMISSION/RECEPTION OF MAILS OF UP TO MIDDLE DATA AMOUNT (NOT TO RECEIVE MAILS OF LARGE DATA AMOUNT, BUT IN THAT CASE TO STAND BY UNTIL ENTRANCE INTO COVERAGE OF HIGH SPEED COMMUNICATION NETWORK) |
| WITHIN COVERAGE OF LOW SPEED COMMUNICATION NETWORK 60 | TO ALLOW TRANSMISSION/RECEPTION OF MAILS OF SMALL DATA AMOUNT ONLY (FOR MAILS OF MIDDLE AND LARGE DATA AMOUNT, TO STAND BY UNTIL ENTRANCE INTO COVERAGE OF MIDDLE AND HIGH SPEED COMMUNICATION NETWORKS) |

MOBILE TERMINAL MAIL SYSTEM, MOBILE TERMINAL MAIL CONTROL METHOD, AND MOBILE TERMINAL MAIL CONTROL PROGRAM

INCORPORATION BY REFERENCE

This application is based upon and claims the benefit of priority from Japanese patent application No. 2007-188405, filed on Jul. 19, 2007, the disclosure of which is incorporated herein in its entirety by reference.

BACKGROUND OF THE INVENTION

1. Field of the Invention

The present invention relates to a mobile communication service for performing electronic mail communication through a high speed mobile communication network.

2. Description of the Related Art

Network infrastructures, portable telephones and data-card terminals, which are adapted for high speed communication networks, have become widespread. Occasions for using electronic mail to send large volume files and data have been increasing.

In such communication environments, in order to efficiently transmit/receive electronic mail containing a large volume of data utilizing a high speed communication network, for example, a user of a mobile terminal which utilizes a wireless communication network is required to transmit/receive electronic mail after confirming that a connection to a high speed communication network has been established.

Since the introduction of wireless high speed communication networks is progressing in stages, multiple wireless communication networks of different communication speeds coexist. Therefore, a user of a mobile terminal is normally unable to recognize the communication speed of the communication network to which the mobile terminal is connected.

Moreover, when a user of a mobile terminal receives electronic mail, if the mobile terminal is inside the coverage area of the wireless communication network, the user of the mobile terminal manipulates electronic mailer of the mobile terminal in order to receive the electronic mail so that the electronic mail is received by the mobile terminal from an incoming mail server at an electronic mail center.

On the other hand, when the mobile terminal is outside the coverage area of the network, the user is required to perform the procedure for receiving electronic mail after the mobile terminal enters the coverage area of the wireless communication network.

Further, when transmitting electronic mail as well, if the mobile terminal is inside the coverage area of a wireless communication network, a user of the mobile terminal performs the procedure for transmitting electronic mail so that the electronic mail is transmitted.

On the other hand, when electronic mail is to be transmitted while the mobile terminal is outside the coverage area of the network, upon receiving a transmission instruction of electronic mail from a user of a mobile terminal, the electronic mailer enters a transmission waiting state (a transmission standby state). In this case, upon detecting that the mobile terminal is inside the coverage area of the communication network, the electronic mailer is automatically activated so that the electronic mail is transmitted.

However, in this case, the user of the mobile terminal is unaware of the communication speed of the wireless communication network to which the mobile terminal has connected. Because of this, there is a risk, for example, that transmission/reception of electronic mail containing a large volume of files or data is initiated on a low speed communication network (line) or a user inadvertently performs the procedure for transmitting/receiving electronic mail containing a large volume of files or data by using a low speed communication network (line).

In such a case, a loss of data, or the erroneous transmission of data, which is to be transmitted, is more likely to occur. Further, a problem will arise in that there may be an additional increase in communication time and communication cost. Furthermore a problem may arise in that the communication speed is further reduced due to the increase in communication traffic.

To cope with the above described problems, there is disclosed a method of notifying the user of a mobile terminal of the communication speed of the wireless communication network to which the mobile terminal is currently connected (see Japanese Patent Laid-Open No. 2003-209870 and No. 2006-173778).

However, in the technology according to Japanese Patent Laid-Open No. 2003-209870 and 2006-173778, a problem exists in that even if a user is notified of a connection with a high speed communication network, the user cannot transmit/receive electronic mail if the user does not notice the notification or if the user cannot operate the mobile terminal, thus reducing efficiency.

SUMMARY OF THE INVENTION

An exemplary object of the present invention is to provide a mobile terminal mail system, a mobile terminal mail control method, and a mobile terminal mail control program, which can solve the above described problems and enable efficient execution of the transmission/reception of electronic mail by a mobile terminal.

A mobile terminal mail system according to an exemplary aspect of the invention includes a plurality of wireless communication networks having different communication speeds, a mobile terminal including an electronic mailer, and an electronic mailer activation apparatus which is adapted to, when the mobile terminal has connected to one of the wireless communication networks whose communication speed is equal to or greater than a fixed communication speed, activate the electronic mailer through the wireless communication network.

A mobile terminal mail control method according to an exemplary aspect of the invention controls the activation operation of an electronic mailer in a mobile terminal mail system including a plurality of wireless communication networks having different communication speeds, a mobile terminal including an electronic mailer, and an electronic mailer activation apparatus for activating the electronic mailer through the wireless communication network, the mobile terminal mail control method includes: a wireless communication network connection process wherein the mobile terminal establishes a connection to the wireless communication network, a wireless connection detection process wherein the mobile terminal detects establishment of a connection to a wireless communication network whose communication speed is equal to or greater than a fixed communication speed, and an electronic mailer activation process wherein the electronic mailer activation apparatus activates the electronic mailer of the mobile terminal to which connection has been detected.

A mobile terminal mail control program product according to an exemplary aspect of the invention causes a computer which communicates with a mobile terminal including an electronic mailer through one of wireless communication networks having different communication speeds to be adapted to implement an electronic mailer activation function for activating the electronic mailer of the mobile terminal connected to the wireless communication network.

The above and other objects, features, and advantages of the present invention will become apparent from the following description with reference to the accompanying drawings which illustrate an example of the present invention.

BRIEF DESCRIPTION OF THE DRAWINGS

FIG. 2 is a sequence chart to show the operation processing steps in the mobile terminal mail system disclosed in FIG. 1;

FIG. 3 is an explanatory drawing to show an example of the table indicating the control course of an electronic mailer depending on communication conditions.

DETAILED DESCRIPTION OF EXEMPLARY EMBODIMENTS

First Exemplary Embodiment

Figure 1:
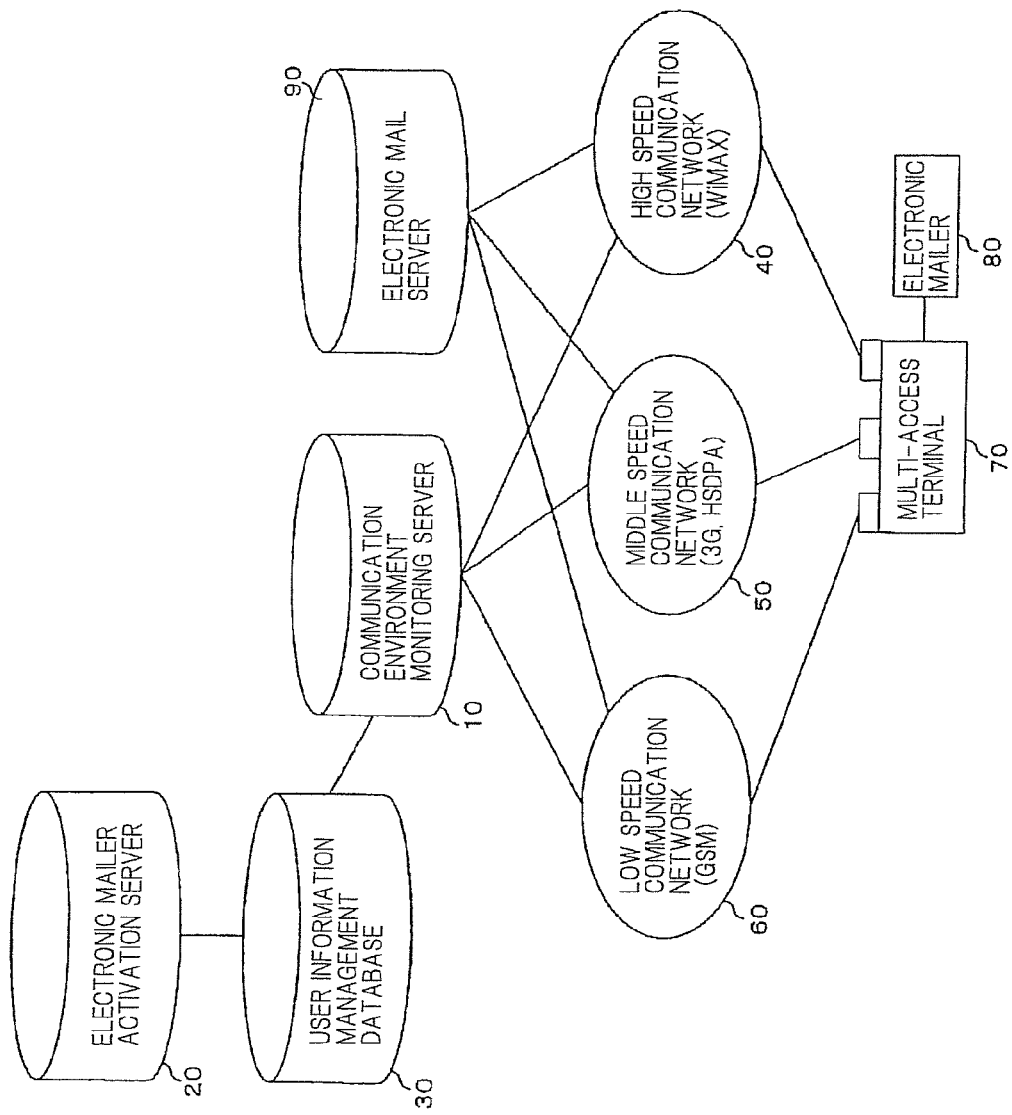
FIG. 1 is a schematic block diagram to generally show an exemplary embodiment of the mobile terminal mail system according to the present invention.

A first exemplary embodiment of the present invention includes, as shown in FIG. 1, multi-access terminal (mobile terminal) 70, electronic mailer 80, low speed communication network 60, middle speed communication network 50, and high speed communication network 40. Multi-access terminal 70 includes an interface for wirelessly connecting to each of communication networks that have different communication speeds. Electronic mailer 80 performs the transmission/reception of electronic mail via multi-access terminal 70. Each of low speed communication network 60, middle speed communication network 50, and high speed communication network 40 provides a wireless link to multi-access terminal 70.

Low speed communication network 60 provides a wireless link having a low communication speed to multi-access terminal 70. Middle speed communication network 50 provides a wireless link having a middle communication speed to multi-access terminal 70. High speed communication network 40 provides a wireless link having a high communication speed to multi-access terminal 70. Low speed communication network 60, middle speed communication network 50, and high speed communication network 40 are hereinafter generally referred to as communication networks (40, 50, and 60). Here, as low speed communication network 60, for example, GSM (Global System for Mobile) is assumed. As middle speed communication network 50, for example, 3G or HSDPA (High Speed Downlink Packet Access) is assumed. Also as high speed communication network 40, WiMAX (World Interoperability for Microwave Access) is assumed.

Moreover, the embodiment includes communication environment monitoring server 10, user information management database (terminal information database apparatus) 30, electronic mailer activation server (electronic mailer activation apparatus) 20, and electronic mail server 90. Communication environment monitoring server 10 is connected to each communication network (40, 50, and 60) and monitors the connection between multi-access terminal 70 and each communication network. User information management database 30 is connected to communication environment monitoring server 10 and stores the user information of multi-access terminal 70. Electronic mailer activation server 20 is connected to user information management database 30 and activates electronic mailer 80. Electronic mail server 90 is connected to each communication network (40, 50, and 60) and transmits/receives electronic mail to and from electronic mailer 80.

Hereinafter, this will be described in detail.

Multi-access terminal 70 is adaptable for a plurality of wireless network schemes and includes a multiple wireless connection function for performing wireless communication connections by selecting high speed communication network 40, middle speed communication network 50, or low speed communication network 60 depending on communication conditions.

Multi-access terminal 70 includes both a wireless link capturing function of capturing a wireless link signal transmitted from communication network (40, 50, and 60) and a wireless connection establishment function of initiating a wireless connection by using the captured wireless link signal.

Thereby, when a user carrying multi-access terminal 70 is located inside the coverage area of any of communication networks (40, 50, and 60), a wireless connection with a corresponding communication network is automatically started.

Further, as a result of this, at a time point when a user carrying multi-access terminal 70 enters into the communication coverage area of each communication network, communication between multi-access terminal 70 and an access point (a wireless communication base station) in each communication network is started.

Furthermore, multi-access terminal 70 includes preset, unique terminal discrimination information. Such terminal discrimination information may be MAC address (Media Access Control).

Moreover, multi-access terminal 70 may include a function of selecting a network to which wireless connection is to be made, in an overlapped region of a communication coverage area.

Electronic mailer 80 includes an electronic mail transmission/reception execution function of receiving electronic mail from electronic mail server 90 in response to an electronic mailer activation request sent from electronic mailer activation server 20, and further of executing the transmission of electronic mail which is in a transmission standby state in multi-access terminal 70.

Thereby, it is possible to automatically execute the transmission/reception of electronic mail without the user directly operating multi-access terminal 70 and electronic mailer 80.

It is noted that although the embodiment shows an example in which electronic mailer 80 is provided outside multi-access terminal 70, electronic mailer 80 may be provided inside multi-access terminal 70.

Communication environment monitoring server 10 includes a terminal connection state monitoring function for constantly monitoring whether pre-registered multi-access terminal 70 is connected to any of high speed communication network 40, middle speed communication network 50, and low speed communication network 60, or is in a state in which it is outside of the communication coverage area thereof.

It is noted that, in the embodiment, as shown in FIG. 1, high speed communication network 40, middle speed communication network 50, and low speed communication network 60 are connected in parallel to communication environment monitoring server 10.

Moreover, communication environment monitoring server 10 includes a terminal connection detection function for detecting when multi-access terminal 70 has connected to communication network (40, 50, and 60), and a communication speed acquisition function for acquiring the communication speed of the communication network to which multi-access terminal 70 is connected. Communication environment monitoring server 10 includes a terminal connection information notification function for notifying user information management database 30 of the acquired communication speed and the terminal identification information of multi-access terminal 70 to which connection has been detected.

By constantly performing the terminal connection information notification function, communication environment monitoring server 10 can perform synchronization of the communication state information, which indicates to which communication network multi-access terminal 70 is connected, that is, the level of the communication speed of the communication network to which the terminal is connected, with user information management database 30.

Moreover, communication environment monitoring server 10 includes a terminal discrimination information storage function for prestoring unique terminal discrimination information in multi-access terminal 70.

Thereby, communication environment monitoring server 10 can supervise the respective wireless connection state of a pre-registered, plurality of multi-access terminals 70.

Telephone numbers or MAC addresses that are unique to a portable terminal such as a portable phone, PDA, etc. may be utilized as terminal discrimination information of multi-access terminal 70 that is pre-registered in communication environment monitoring server 10.

Thereby, communication environment monitoring server 10 can recognize to which communication network multi-access terminal 70 is wirelessly connected.

Electronic mailer activation server 20 includes an electronic mailer activation function for transmitting an electronic mailer activation request signal for requesting the activation of electronic mailer 80 to multi-access terminal 70 in accordance with an activation application signal sent from user information management database 30.

The activation application signal may include terminal discrimination information of multi-access terminal 70 comprising electronic mailer 80, and information to determine the communication network to which multi-access terminal 70 is connected.

The electronic mailer activation request signal is transmitted through the communication network to which multi-access terminal 70 is connected.

It is noted that although, in the embodiment, an example in which electronic mailer activation server 20 is connected to user information management database 30 is described, electronic mailer activation server 20 may be connected to each of communication networks (40, 50, and 60) through a communication line.

User information management database 30 includes an electronic mailer activation application judgment function for judging whether or not to activate electronic mailer 80 in accordance with the terminal identification information and the communication speed information notified from communication environment monitoring server 10.

Prior to executing the electronic mailer activation application judgment function, user information management database 30 makes a judgment to allow automatic activation of the electronic mailer when the notified communication speed information is of higher than a preset, fixed communication speed (allowable communication speed judgment function).

Here, the preset, fixed communication speed may be changeable. Thereby, it is possible to change the communication speed at which the electronic mailer is automatically activated, depending on the mail size (volume) of the electronic mail to be transmitted/received.

As a result of this, it is possible to effectively utilize communication networks having different communication speeds depending on the volume of the electronic mail to be transmitted/received.

Further, user information management database 30 includes an application list storage function for storing a mailer activation application list which lists multi-access terminals to which the electronic mailer activation function is applied. Further, user information management database 30 includes an activation application terminal judgment function for judging whether or not there is a match between the multi-access terminal (information) indicated in the mailer activation application list and the terminal identification information notified from communication environment monitoring server 10.

Thereby, user information management database 30 can judge whether or not to execute the electronic mailer activation function of the electronic mailer included in the terminal (for example, multi-access terminal 70) which is notified from communication environment monitoring server 10.

Furthermore, user information management database 30 includes an activation application signal transmission function for transmitting an activation application signal for instructing electronic mailer activation server 20 to execute the electronic mailer activation request function, when the communication network to which multi-access terminal 70 is connected has a communication speed higher than or equal to a preset communication speed, and when multi-access terminal 70 is indicated in the mailer activation application list.

Thereby, electronic mailer activation server 20 executes the electronic mailer activation function by using an activation application signal as a trigger.

Each of communication networks (40, 50, and 60) includes a wireless base station (or an access point) to provide a wireless link. As described above, each of low speed communication network 40, middle speed communication network 50, and high speed communication network 60, which have different communication speeds, includes a wireless link providing function for providing a wireless link to multi-access terminal 70.

It is noted that communication networks (40, 50, and 60) constantly transmit a wireless link signal so that when a user carrying multi-access terminal 70 enters into the communication coverage area of respective communication network, multi-access terminal 70 captures the wireless link signal thereby initiating a wireless connection.

Electronic mail server 90 is connected to each of communication networks 40, 50, and 60. Electronic mail server 90 includes a function for transmitting incoming mail that corresponds to an incoming mail request upon receiving the incoming mail request from electronic mailer 80 through the communication network to which multi-access terminal 70 is wirelessly connected; and a function for receiving the electronic mail sent from electronic mailer 80 through the communication network to which multi-access terminal 70 is wirelessly connected and transmitting the electronic mail to the destination.

Operation of the First Exemplary Embodiment

Next, the operation of the first exemplary embodiment will be described.

First, multi-access terminal 70 connects to wireless communication network (40, 50, or 60) (wireless communication network connection process). Next, communication environment monitoring server 10 notifies user information management database 30 of both the communication speed of the communication network to which mobile terminal 70 is connected and the user information of multi-access terminal 70 (terminal information notification process). After that, user information management database 30 performs authentication processing of user information when the notified communication speed is equal to or greater than a fixed communication speed (terminal registration authentication process).

Next, electronic mailer activation server 20 activates electronic mailer 80 in authenticated multi-access terminal 70 (electronic mailer activation process).

Here, concerning the wireless communication network connection function, the terminal information notification function, the terminal registration authentication function, and the electronic mailer activation function, tasks thereof may be programmed so that each function may be executed by a computer.

Next, the operation of the mobile terminal mail system according to the first exemplary embodiment will be described based on the sequence chart shown in FIG. 2.

First, when a user carrying multi-access terminal 70 enters into the coverage area of high speed communication network 40, wireless connection is established (step S101: wireless communication connection process). Next, communication environment monitoring server 10 detects when multi-access terminal 70 is connected to a communication network whose communication speed is equal to or greater than a fixed communication speed (step S102). Next, communication environment monitoring server 10 notifies user information management database 30 of the terminal identification information of multi-access terminal 70 and the communication speed of the communication network to which multi-access terminal 70 is connected (step S203: terminal information notification process).

Next, user information management database 30 performs registration authentication of the notified terminal identification information based on pre-registered terminal discrimination information (user information) (step S104: terminal registration authentication process).

When multi-access terminal 70 is registered and authenticated (step S105), user information management database 30 transmits an activation application signal to electronic mailer activation server 20 (step S106). Next, electronic mailer activation server 20 transmits an electronic mailer activation request to electronic mailer 80 based on an activation application signal (step S107: electronic mailer activation process).

Depending on the communication speed of the wireless communication network which a mobile terminal is accessing, the communication data volume (electronic mail volume) on which transmission/reception is performed is variably determined in an automatic fashion.

Since, as so far described, the first exemplary embodiment is configured and functions as described above, the electronic mailer is automatically activated as the mobile terminal initiates wireless communication to and from a wireless communication network whose communication speed is equal to or greater than a fixed communication speed. Thereby, it is possible to efficiently transmit/receive electronic mail containing a large volume of data through a communication network having a high data transmission rate.

Second Exemplary Embodiment

Next, a mobile terminal mail system according to a second exemplary embodiment relating to the present invention will be described. Here, the same parts as those of the first exemplary embodiment will be designated like symbols.

The second exemplary embodiment includes approximately the same configuration as that of the first exemplary embodiment (see FIG. 1) regarding the equipment components of the system.

Here, the second exemplary embodiment differs from the first exemplary embodiment in that user information management database 30 stores a communication volume parameter table for specifying the electronic mail transmission/reception operation of the electronic mailer depending on the communication speed of the wireless communication network to which multi-access terminal 70 is connected, and in that electronic mailer activation server 20 includes a function for controlling the transmission/reception operation of electronic mailer 80 based on the communication volume parameter table. Functions in other configurations will be the same as those of the first exemplary embodiment.

Further, the communication volume parameter table stores, as shown in FIG. 3, the electronic mail size allowed for transmission/reception (hereinafter, referred to as an "upper limit volume"), which is preset and which corresponds to each wireless communication network of a different communication speed; and stores a control course on the electronic mail transmission/reception operation of electronic mailer 80.

Further, user information management database 30 includes a control policy notification function for notifying electronic mailer activation server 20 of the control policy on the electronic mail transmission/reception operation that is defined by the communication volume parameter table.

Here, other features and configurations of user information management database 30 are the same as those of the above described first exemplary embodiment.

Electronic mailer activation server 20 includes an electronic mailer activation function for transmitting to multi-access terminal 70 an electronic mailer activation request signal for requesting the activation of electronic mailer 80 based on an activation application signal sent from user information management database 30.

Here, the activation application signal may include terminal discrimination information of multi-access terminal 70 including electronic mailer 80, and information to identify the communication network to which multi-access terminal 70 is connected.

Further, electronic mailer activation server 20 includes an electronic mailer transmission/reception control function for controlling the electronic mail transmission/reception operation of activated electronic mailer 80, based on the control policy on the electronic mail transmission/reception operation sent from user information management database 30.

Here, electronic mailer activation server 20 may execute an electronic mailer transmission/reception control function by transmitting a mailer control signal to electronic mailer 80 through a wireless communication network to which multi-access terminal 70 is connected.

Thereby, the above described electronic mailer 80 can control the transmission/reception operation of electronic mail based on a received mailer control signal.

Moreover, in the present embodiment, it is possible to change the electronic mail data amount (upper limit volume) to be transmitted/received through a wireless communication network depending on the communication speed of the wireless communication network to which multi-access terminal 70 is connected.

Thereby, when, for example, multi-access terminal 70 has connected to high speed communication network 40, control for executing the transmission/reception of electronic mails of all sizes is performed. Further, when multi-access terminal 70 has connected to middle speed communication network 50, control for allowing the transmission/reception of electronic mails of up to a middle data amount is performed. Furthermore, in this case, control is performed such that mail having a large volume of data is not transmitted/received, but is kept in a reception standby state until the terminal connects to the coverage area of high speed communication network 40.

Moreover, when multi-access terminal 70 is connected to low speed communication network 60, control is performed such that only electronic mail having a small amount of data is allowed to be transmitted/received, and electronic mail having a middle and large amount of data is kept in a standby state until the terminal is connected to communication network 40 or 50. In this way, it is possible to effectively execute the transmission/reception of electronic mails of different volumes by controlling the electronic mail transmission/reception operation of electronic mailer 80 based on the communication speed of the wireless communication network to which multi-access terminal 70 has connected, and based on the volume of the electronic mail to be transmitted/received.

Operation of the Second Exemplary Embodiment

Next, the operation of the second exemplary embodiment will be described.

First, multi-access terminal 70 connects to wireless communication network (40, 50, or 60) (wireless communication network connection process). Next, communication environment monitoring server 10 notifies user information management database 30 of both the communication speed of the communication network to which mobile terminal 70 is connected and the user information of multi-access terminal 70 (terminal information notification process). After that, when the notified communication speed is equal to or greater than a fixed communication speed, user information management database 30 performs authentication processing of user information (terminal registration authentication process), and determines the transmission/reception volume for each item of electronic mail to be transmitted/received by electronic mailer 80 based on the notified communication speed (outgoing/incoming mail volume determination process). Next, electronic mailer activation server 20 activates electronic mailer 80 of authenticated multi-access terminal 70 and controls the electronic mail transmission/reception of electronic mailer 80 based on the determined transmission/reception volume of each item of electronic mail (mail transmission/reception control process).

Here, concerning the wireless communication network connection function, the terminal information notification function, the terminal authentication function, the outgoing/incoming mail volume determination function, and the mail transmission/reception control function, these may be programmed so that each function may be executed by a computer.

Figure 4:
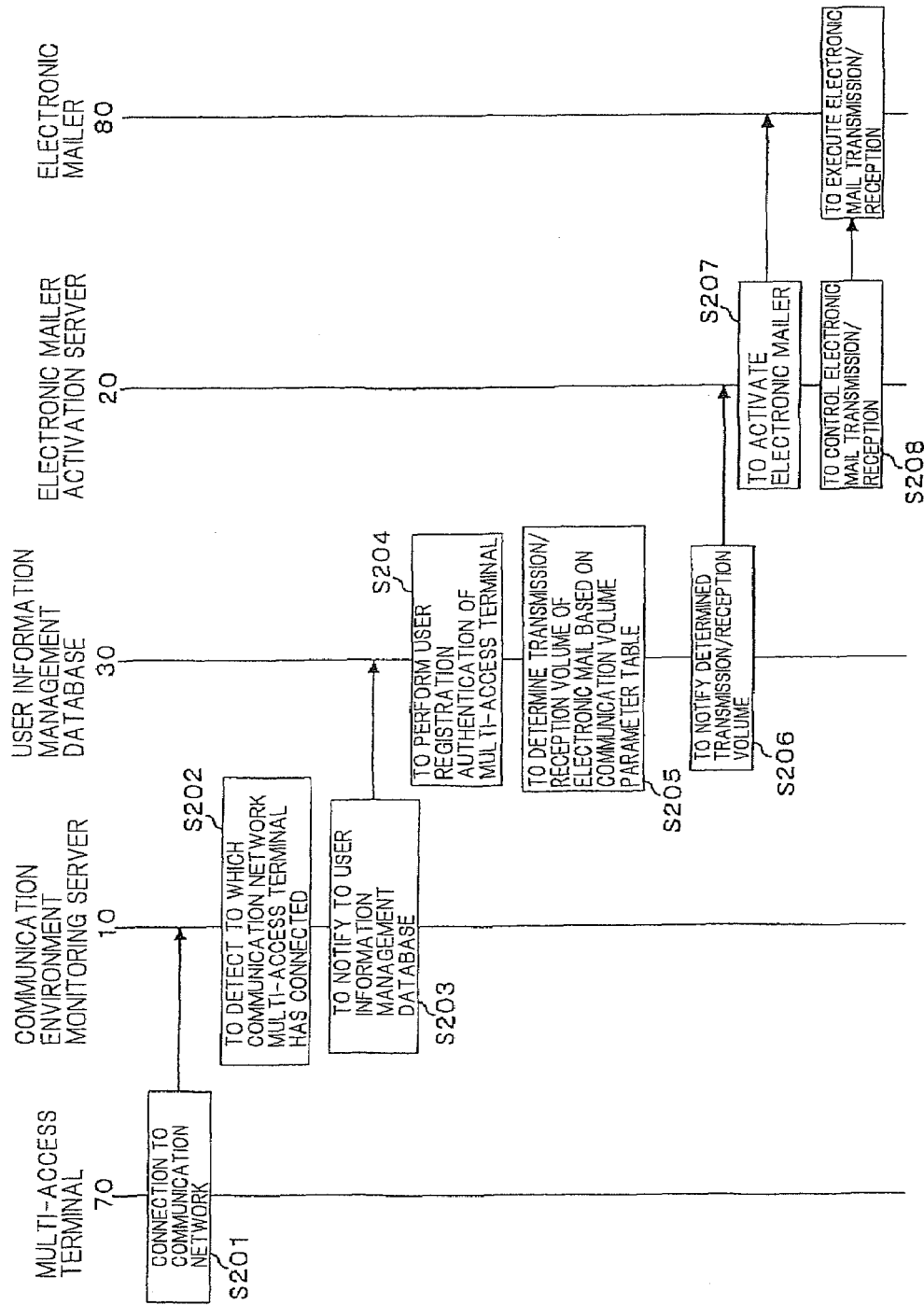
FIG. 4 is a sequence chart to show the operation processing steps of an embodiment of the mobile terminal mail system according to the present invention.

Next, the operation of the mobile terminal mail system of the second exemplary embodiment will be described based on the sequence chart shown in FIG. 4.

First, when a user carrying multi-access terminal 70 enters into the coverage area of high speed communication network 40, wireless connection is established (step S201: wireless communication connection process). Next, communication environment monitoring server 10 detects to which communication network multi-access terminal 70 is connected (step S202). After that, communication environment monitoring server 10 notifies user information management database 30 of the terminal identification information of multi-access terminal 70 and the communication speed of the communication network to which multi-access terminal 70 has connected (step S203: terminal information notification process).

After that, user information management database 30 performs registration authentication of the notified terminal identification information based on pre-registered terminal discrimination information (user information) (step S204: terminal registration authentication process). Next, user information management database 30 determines the transmission/reception volume of each item of electronic mail to be transmitted/received by electronic mailer 80 in accordance with the pre-registered communication volume parameter table and the notified communication speed (step S205: outgoing/incoming mail volume determination process), and notifies the determination result to electronic mailer activation server 20 (step S206). After that, electronic mailer activation server 20 activates electronic mailer 80 in authenticated multi-access terminal 70 (step S207), and controls the electronic mail transmission/reception of electronic mailer 80 based on the determined transmission/reception volume of each item of electronic mail (step S208: mail transmission/reception control process (S207 to S208)).

Since, as so far described, the second exemplary embodiment is configured to function as described above, an electronic mailer is automatically activated as a mobile terminal initiates wireless communication with a wireless communication network, and electronic mail whose data amount corresponds to the communication speed of the wireless communication network to which the mobile terminal has connected is transmitted/received. Thereby, it is possible to perform effective electronic mail transmission/reception conforming to the size (volume) of each item of electronic mail.

The present invention may be applicable to communication network services to be provided for mobile terminals utilizing a high speed wireless communication network.

An exemplary advantage according to the invention is to provide an unprecedented excellent mobile terminal mail system, a mobile terminal mail control method, and a mobile terminal mail control program in which an electronic mailer can be automatically activated by the mobile terminal that initiates wireless communication with the wireless communication network, thereby enabling efficient execution of the transmission/reception of electronic mail due to a configuration that includes a plurality of wireless communication networks having different communication speeds, and a mobile terminal including an electronic mailer, and that includes an electronic mailer activation apparatus for activating the electronic mailer through the wireless communication network when the mobile terminal connects to one of the wireless communication networks whose communication speed is equal to or greater than a fixed communication speed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile terminal mail system, comprising:
a plurality of wireless networks having different communication speeds;
a mobile terminal including an electronic mailer; and
an electronic mailer activation apparatus which, when said mobile terminal has connected to one of said wireless communication networks whose communication speed is equal to or greater than a fixed communication speed, activates said electronic mailer through said wireless communication network, and when said mobile terminal has connected to one of said wireless communication networks whose communication speed is not equal to or greater than the fixed communication speed, does not activate said electronic mailer through said wireless communication network, such that each of one or more electronic mail is completely transmitted when said electronic mailer is activated, and such that each of the one or more electronic mail is not even partially transmitted when said electronic mailer has not been activated.

2. The mobile terminal mail system according to claim 1, wherein
said electronic mailer of said mobile terminal comprises an electronic mail reception function for receiving electronic mail through the wireless communication network to which said mobile terminal has connected.

3. The mobile terminal mail system according to claim 1, wherein
said electronic mailer of said mobile terminal comprises an electronic mail transmission function for transmitting electronic mail through the wireless communication network to which said mobile terminal is connected.

4. The mobile terminal mail system according to claim 3, wherein
said mobile terminal detects establishment of a connection to said wireless communication network, and said wireless communication network comprises a communication network monitoring apparatus which acquires the communication speed of said wireless communication network.

5. The mobile terminal mail system according to claim 4, further comprising
a terminal information database apparatus in which user information of said mobile terminal has been pre-stored, wherein the terminal information database apparatus comprises a mobile terminal authentication function for authenticating said mobile terminal, to which establishment of a connection has been detected, based on said user information.

6. The mobile terminal mail system according to claim 5, wherein
said electronic mailer activation apparatus comprises an authenticated terminal electronic mailer activation function for activating the electronic mailer of said authenticated mobile terminal.

7. The mobile terminal mail system according to claim 5, wherein
said terminal information database apparatus comprises a communication mail volume storage function for storing an upper limit volume of each item of electronic mail to be transmitted/received by said each wireless communication network, said upper limit volume being preset depending on the communication speed of said each wireless communication network,
said electronic mailer activation apparatus comprises an electronic mailer transmission/reception control function for controlling the transmission/reception of electronic mail to be executed by said electronic mailer, based on the communication speed of a communication network to which said authenticated mobile terminal has connected and based on said stored upper limit volume, and said stored upper limit volume of each item of electronic mail specifies a maximum portion of each item of electronic mail to be transmitted, such that a transmitted portion of each item of electronic mail is not to exceed said stored upper limit volume.

8. The mobile terminal mail system according to claim 7, wherein
said wireless communication networks includes a high speed communication network, a middle speed communication network, and a low speed communication network in terms of communication speed, and
said terminal information database apparatus comprises a parameter storage function for storing electronic mail parameter information in which the communication speed of each of said high speed communication network, said middle speed communication network, and said low speed communication network is associated with said upper limit volume of electronic mail that is set depending on said communication speed.

9. A mobile terminal mail control method for controlling an activation operation of an electronic mailer in a mobile terminal mail system including wireless communication networks having different communication speeds, a mobile terminal including the electronic mailer, and an electronic mailer activation apparatus which activates said electronic mailer through one of said wireless communication networks, said mobile terminal mail control method comprising:
connecting wherein said mobile terminal detects establishment of a connection to the wireless communication network,
detecting wherein said mobile terminal detects establishment of a connection to the wireless communication network at a communication speed, and
wherein said electronic mailer activation apparatus activates the electronic mailer of said mobile terminal when said communication speed at which said mobile terminal is connected with said wireless communication network is equal to or greater than a fixed communication said, and said electronic mailer activation apparatus does not activate the electronic mailer of said mobile terminal when said communication speed at which said mobile terminal is connected with said wireless communication network is not equal to or greater than the fixed communication such that each of one or more electronic mail is completely transmitted when said electronic mailer is activated, and such that each of the one or more electronic mail is not even partially transmitted when said electronic mailer has not been activated.

10. A mobile terminal mail control method for controlling electronic mail transmission/reception by an electronic mailer by means of a communication network monitoring apparatus which detects a connection of a mobile terminal when said mobile terminal including the electronic mailer has connected to one of wireless communication networks whose communication speed is equal to or greater than a fixed communication speed, a terminal information database apparatus which includes user information of said mobile terminal and which authenticates said mobile terminal, and an electronic mailer activation apparatus which activates the electronic mailer of the authenticated mobile terminal, said mobile terminal mail control method comprising:
connecting wherein said mobile terminal establishes a connection to one of said wireless communication networks;
notifying wherein said communication network monitoring apparatus notifies said terminal information database apparatus of communication speed of said wireless communication network and the user information of said mobile terminal;

authenticating wherein said terminal information database apparatus performs authentication of said user information when said notified communication speed is equal to or greater than a fixed communication speed; and wherein said electronic mailer activation apparatus activates the electronic mailer of said mobile terminal when said communication speed at which said mobile terminal is connected with said wireless communication network is equal to or greater than the fixed communication said, and said electronic mailer activation apparatus does not activate the electronic mailer of said mobile terminal when said communication speed at which said mobile terminal is connected with said wireless communication network is not equal to or greater than the fixed communication, such that each of one or more electronic mail is completely transmitted when said electronic mailer is activated, and such that each of the one or more electronic mail is not even partially transmitted when said electronic mailer has not been activated.

11. The mobile terminal mail control method according to claim 10, comprising, in place of said activating:

determining wherein said terminal information database apparatus determines transmission/reception volume of each item of electronic mail to be transmitted/received by said electronic mailer depending on the notified communication speed; and controlling wherein said electronic mailer activation apparatus activates the electronic mailer of said authenticated mobile terminal and controls the electronic mail transmission/reception by said electronic mailer based on said determined transmission/reception volume of each item of electronic mail.

12. A non-transitory computer readable storage medium in which a mobile terminal mail control program is embedded, the program causing a computer which communicates with a mobile terminal including an electronic mailer through one of wireless communication networks that have different communication speeds to be adapted to implement an electronic mailer activation function for activating said electronic mailer of the mobile terminal connected to said wireless communication network, wherein the electronic mailer of said mobile terminal is activated when a communication speed at which said mobile terminal is connected with said wireless communication network is equal to or greater than a fixed communication said and the electronic mailer of said mobile terminal is not activated when said communication speed at which said mobile terminal is connected with said wireless communication network is not equal to or greater than the fixed communication, such that each of one or more electronic mail is completely transmitted when said electronic mailer is activated, and such that each of the one or more electronic mail is not even partially transmitted when said electronic mailer has not been activated.

13. The non-transitory computer readable storage medium according to claim 12, wherein said program further causes said computer to be adapted to implement a mail transmission/reception control function for controlling the electronic mail transmission/reception by said electronic mailer based on a preset volume limit of each item of electronic mail, and wherein said stored upper limit volume of each item of electronic mail specifies a maximum portion of each item of electronic mail to be transmitted, such that a transmitted portion of each item of electronic mail is not to exceed said stored upper limit volume.

* * * * *